July 18, 1944. W. ST. M. E. CRAKE 2,353,881
OIL WELL LINER SCREEN
Filed Dec. 7, 1942

Inventor: Wilfred St. Maur Elmore Crake
By his Attorney:

Patented July 18, 1944

2,353,881

UNITED STATES PATENT OFFICE 2,353,881

OIL WELL LINER SCREEN

Wilfred St. Maur Elmore Crake, Houston, Tex., assignor to Shell Development Company, San Francisco, Calif., a corporation of Delaware Application December 7, 1942, Serial No. 468,303

2 Claims. (Cl. 166—8)

The present invention relates to well screens, and pertains particularly to an improved self-cleaning wire-wrapped well screen.

It is highly essential that the screen employed to admit crude oil into the pipe or tubing string through which it is raised to the surface either under its own pressure or by pumping, shall be strong enough to resist the heavy stresses encountered in the bottom of deep wells. It is also of considerable importance to have a screen with relatively large capacity and one which will not quickly fill or become clogged with sand and other materials.

Various types of well screens, designed to meet these conditions, have been proposed in the art. These screens, however, involve the use of heavy tubing with spaced perforations and some form of protective means over these perforations to keep out the loose material encountered in a borehole. These devices, when made sufficiently strong to withstand the stresses to which they are subjected, have usually a limited screening capacity. A still more serious defect is that due to the tortuous path through which the oil must flow, these screens rapidly become clogged with the loose material from the oil-bearing strata. This results in rapidly decreasing the capacity of the screen and ultimately in blocking it and ending its useful life. In very deep oil wells this is an extremely serious matter, since the expense of withdrawing a screen and resetting it is necessarily very great. Further, it is desirable that liner screens be designed in such a manner that they are economical in material and in fabrication, which requirement it has heretofore been found hard to satisfy in practice.

It is therefore an object of this invention to provide a wire-wrapped well screen having a high strength or resistance to heavy stresses, a large screening capacity and a structure which is economical in material and in fabrication.

It is a further object of this invention to provide a screen having, in addition to the above features, means for washing the screen in place during installation.

A still further object of this invention is to provide a well screen whereby well fluids pass through the screen openings in the wire wrappings and thence upwards directly under said wire, thereby continually washing and maintaining the screen in cleaned condition.

With these and other objects and advantages in view, the invention has particular relation to certain novel features of construction and arrangement of parts, an example of which is given in this specification and illustrated in the accompanying drawing, wherein.

Briefly, the liner screen of the present invention comprises a central, hollow tubular, or solid, mandrel, longitudinal ribs mounted radially to the long axis of the mandrel and formed or fabricated integral with the mandrel, wrappings of wire supported on said ribs, which ribs should be sufficiently high to permit vertical passage of produced fluid under the wires without excessive velocity. The diameter of the mandrel should preferably be from one-quarter to two-thirds of the overall diameter of the screen.

Figure 1:
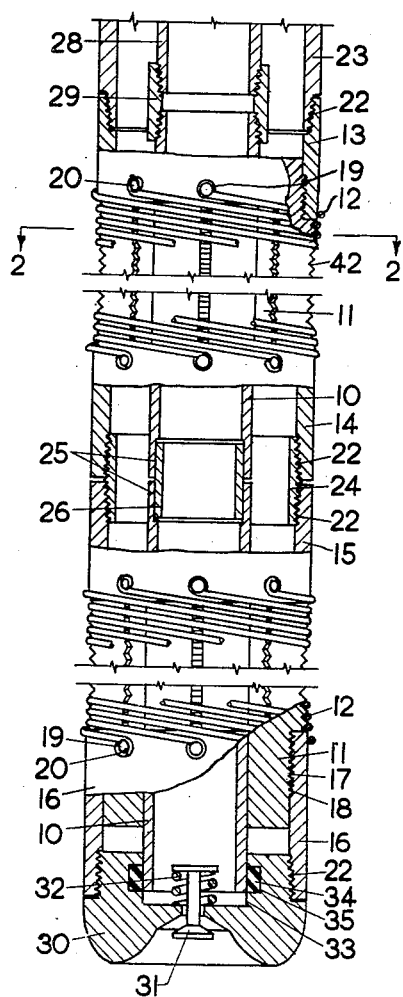
Figure 1 is a view partly in elevation and partly in longitudinal section of a particular embodiment of a well screen, according to the present invention.
Figure 2:
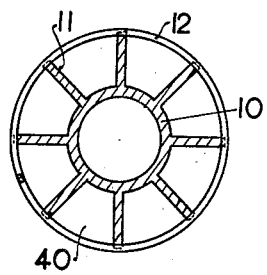
Figure 2 is a cross-section taken along the lines 2—2 in Figure 1.

Referring to Figures 1 and 2, a preferred embodiment of the present invention comprises a laterally non-perforated axial mandrel 10, radial ribs 11 carried by said mandrel 10 and wrappings of wire 12 supported on said ribs 11. End members 13, 14, 15, and 16 are suitably fastened to the ribs and/or the axial mandrel 10 and provide bases for anchoring the ends of the wire 12. The end portions 13, 14, 15, and 16 may, for example, be welded to the ribs, or have internal threads 17 for engagement with threads on the constricted ends 18 of the ribs 11 as shown in the lower part of Figure 1. The ends of the wire 12 may be formed into loops 19 through which pass bolts 20 fastened in the end members 13, 14, 15, and 16 for anchoring the ends of wire 12 or may be otherwise fastened as desired.

The end members 13, 14, 15, and 16 likewise have internal threads 22 on their outer ends. To the outer internal thread 22 of the uppermost end member 13 is attached a length of blank liner pipe 23 or the like, which is suitably supported in the well, such as by connection to a casing packer or the like. To the threaded upper end of the uppermost central mandrel 10 is attached a washing-in tubing string 28 by means of a collar 29.

When two (as shown in Figure 1) or more lengths of liner screen constructed according to the present invention are used, a nipple 24 or the like is provided to join together the end members 14 and 15, the adjacent ends of the central mandrel 10 being counterbored as at 25 to receive a slip ring 26 or the like. It is to be understood that any equivalent or other suitable means of connecting two lengths of the present liner screen may be used.

To the lowermost end member 16 is attached a suitable shoe 30 provided with a downwardly-opening back pressure valve 31 constrained by a coil spring 32 and a counterbore 33 fitted with an annular packing 34 in an annular recess 35 to receive the lower end of the central mandrel 10.

It will be readily appreciated that during production of the well, oil passes through the spaces between the wrappings of wire 12 and thence upwards through the large channels 40 between the ribs 11 and directly under the wire 12, so that the whole screen formed by the wire wrappings is continually washed over internally and thereby maintained in a self-cleaned and properly functioning condition.

The axial mandrel 10 is preferably tubular as shown in Figure 1, so that during installation of the well screen, washing liquid may be forced down through the washing-in tubing 28 and the laterally blind or non-perforated tubular mandrel and out through pressure-responsive back pressure valve 31 and into the borehole, thence through the screen of spaced wrappings of wire 12 and upwards directly under the wire 12 through the channels 40 between ribs 11, whereby mud and debris are washed out of the well screen. After the borehole and liner screen have been sufficiently washed, the circulation of washing liquid is stopped, allowing the pressure-responsive valve 31 to close by the action of the coil spring 32. Then, the tubing string 28 is released from the tubular mandrel 10 and raised sufficiently to allow well fluids entering through the screen to pass upwards through the channels 40 between the ribs 11 and thence up through the tubing string 28. If desired, however, the supporting axial mandrel 10 may be made solid.

The ribs 11 are suitably fastened to the mandrel 10 such as by welding, etc., and are positioned to outline a cylinder around which the wire 12 is wrapped. Preferably, the outer radial edges of the ribs 11 are cut with helical grooves 42 to receive the helical wrappings of wire 12. However, if desired, the outer radial edges of ribs 11 may be smooth and the wire 12 welded or soldered thereto. The wire may be suitably welded or soldered after assembly in between each rib or over each rib so as to prevent unravelling in case of a broken wire. The purpose of this is to weld the wires together and not necessarily to weld them to the supports.

The wire 12 may be formed with a rectangular cross-section having spacing lugs formed thereon in a conventional manner. However, round wire, preferably of small diameter, yields several advantages when used with the structure of the present invention. Although the actual mechanical strength is less in a well screen of small diameter round wire, it is unnecessary to have high mechanical strength with the self-cleaning screen construction of the present invention since such a construction insures the proper functioning of the whole area of the screen and therefore a negligible pressure differential across the screen. The main advantages of such a structure are, first, the shorter length of screen necessary for the same screening capacity, and, second, a smaller amount of metal or other material needed to form the screen. For example, comparing a conventional heavy screen formed of flat wire having cross-sectional dimensions of 0.156 by 0.094 inch with a fine screen formed of 0.03125 inch diameter round wire, both screens having 0.010 inch slots, it was found that in the heavy screen the pitch of the slots is 0.166 inch and there are 72.4 slots per foot, giving 72.4×.010×12=8.7 sq. inches opening per square foot of screen surface, less closure for lugs, soldering, ribs, of—say—25%, yielding a net opening of 6.53 sq. inches per square foot of screen surface. On the other hand in the fine screen the pitch of the slots is .04125 and there are 284 slots per foot, giving 284×.010×12=34.05 sq. inches opening per square foot of screen surface, less closure for soldering and ribs, say 20%, yielding a net opening per foot of screen surface of 27.24 sq. inches. Thus, the opening area of small wire screen is 417% of that of the conventional heavy screen. It may also be shown that this heavy screen requires 12.75 cu. inches of metal per square foot of screen surfaces, while the light wire screen requires only 3.57 cu. inches of metal for the same area, which latter amount is only 28% of the metal needed in the conventional heavy screen.

Various modifications and changes may be made in the above-described embodiment without departing from the spirit of the present invention as defined by the scope of the appended claims. For example, the ribs 11 and mandrel 10 may be made as an integral unit, which form is particularly applicable in fabricating with plastics, such as by extrusion processes. In addition to using plastics and the like for the ribs and mandrel the wrappings of wire may be also made of plastic material, if desired.

I claim as my invention:

1. In an oil-well screen, an elongated axial mandrel member, a plurality of ribs extending radially outwards to a substantial distance from said mandrel member, the outer edges of said ribs being spirally grooved in the middle portion and screw-threaded on the ends, internally threaded tubular end members threadably engaged with the threaded ends of said ribs and adapted for connection to a flow string, and wire spirally wound in the grooves of said ribs to form a well strainer, the ends of said wire being affixed to said tubular end members, whereby a series of parallel vertical passages surrounding said mandrel member is formed between said ribs for the flow of the oil entering the wire strainer.

2. In an oil well screen, a laterally non-perforated axial tubular mandrel member, a plurality of ribs extending radially outwards a substantial distance from said mandrel member, the outer edges of said ribs being screw-threaded on the ends, internally threaded tubular end members threadably engaged with the threaded ends of said ribs and adapted for connection to a flow string, wire spirally wound over said ribs to form a well strainer, the ends of said wire being affixed to said tubular end members, whereby a series of parallel vertical passages surrounding said mandrel member is formed between said ribs for the upward flow of oil entering through the well strainer, and closure means carried by the lowermost of said tubular end members and adapted to prevent fluid communication between said passages and the inside of said tubular mandrel at the bottom of the screen.

WILFRED ST. MAUR ELMORE CRAKE.